United States Patent
Lai et al.

(10) Patent No.: US 8,335,172 B2
(45) Date of Patent: Dec. 18, 2012

(54) SWITCHABLE CONFERENCE MULTICAST STREAMING WITH DYNAMIC ASYMMETRY

(75) Inventors: Cheng-Jia Lai, Mountain View, CA (US); Jing Li, Palo Alto, CA (US); Din-I Tsai, Fremont, CA (US); Joji Thomas Mekkattuparamban, Sunnyvale, CA (US); Ming Chen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 12/797,716

(22) Filed: Jun. 10, 2010

(65) Prior Publication Data

US 2011/0305170 A1 Dec. 15, 2011

(51) Int. Cl.
*H04L 12/18* (2006.01)

(52) U.S. Cl. ......... 370/261; 370/263; 370/392; 370/432

(58) Field of Classification Search ........................ None
See application file for complete search history.

(56) References Cited

U.S. PATENT DOCUMENTS

| | | | |
|---|---|---|---|
| 6,754,224 B1 | 6/2004 | Murphy | |
| 7,079,495 B1 | 7/2006 | Pearce et al. | |
| 7,453,826 B2 | 11/2008 | Wildfeuer et al. | |
| 7,580,375 B1 * | 8/2009 | Friedrich et al. | 370/260 |
| 7,764,704 B2 * | 7/2010 | Tzeng et al. | 370/412 |
| 7,986,702 B1 * | 7/2011 | Reister | 370/401 |
| 8,107,403 B2 * | 1/2012 | Barave et al. | 370/260 |
| 2002/0137459 A1 * | 9/2002 | Ebata et al. | 455/16 |
| 2007/0008968 A1 * | 1/2007 | Baker et al. | 370/390 |
| 2007/0291755 A1 * | 12/2007 | Cheng et al. | 370/390 |
| 2011/0141221 A1 * | 6/2011 | Satterlee et al. | 348/14.08 |

* cited by examiner

*Primary Examiner* — Hassan Phillips
*Assistant Examiner* — Duc Duong
(74) *Attorney, Agent, or Firm* — Edell, Shapiro & Finnan, LLC

(57) ABSTRACT

Techniques are provided herein to add multicast media streams to teleconferencing sessions without the unwanted side effects that occur when a speaker's own media is echoed back to the speaker. Multicast and unicast media streams are generated by a network device, e.g., a conference bridge, and distributed to any number of endpoints, e.g., conference endpoints. A media selector is provided that selects the appropriate multicast or unicast media stream for forwarding to an associated network endpoint.

23 Claims, 8 Drawing Sheets

SWITCHABLE CONFERENCE MULTICAST STREAMING WITH DYNAMIC ASYMMETRY

TECHNICAL FIELD

The present disclosure relates generally to teleconferencing, and more specifically to dynamically switching between multicast and unicast media streams to target media content to the appropriate conference participants.

BACKGROUND

Video conferencing or video teleconferencing provides a way for parties at different locations to see and hear each other while holding a conference. Video conferencing has been demonstrated since the advent of the television, but did not become commercially viable until the 1980's with the development of the Integrated Services Digital Network (ISDN). ISDN is a set of communications standards that allow for transmission of voice video and data over the copper wires of the Public Switched Telephone Network (PSTN). As the Internet has grown, video conferencing tools have migrated toward packet switched Internet Protocol (IP) based networks.

In IP based video conferencing, a conference bridge may be used to aggregate and distribute data. For example, when a conference has five parties at five different locations, each of the locations streams audio and video to the conference bridge. The conference bridge then streams one of the video streams, usually associated with the lecturer or primary speaker, to all of the locations such that all participants may see the speaker, e.g., using IP unicast video streams that are streamed to each individual participant. Audio, on the other hand, may be mixed by the conference bridge before being streamed to the parties. In one example, the primary speaker's voice along with the voice of one or two other conferees may be mixed before being streamed so that all participants can hear a conversation. The audio from any other conference participants (conferees) is filtered out, thereby reducing background noise.

DESCRIPTION OF EXAMPLE EMBODIMENTS

Overview

Techniques are provided herein for receiving at a first network device in a network, one or more media streams addressed to a second network device. A determination is made as to whether a unicast media stream is present among the one or more media streams. In response to determining that a unicast media stream is present, the unicast media stream is forwarded to the second network device. Other media streams may be dropped by the first network device.

Techniques are also provided herein for receiving a plurality of media streams to be distributed throughout a network from a plurality of network endpoints. A determination is made as to which of the plurality of media streams is associated with an active endpoint to obtain an active media stream. A multicast data stream is generated comprising information obtained from the active media stream and a unicast data stream is generated comprising information obtained from media streams associated with non-active endpoints.

Example Embodiments

Figure 1:
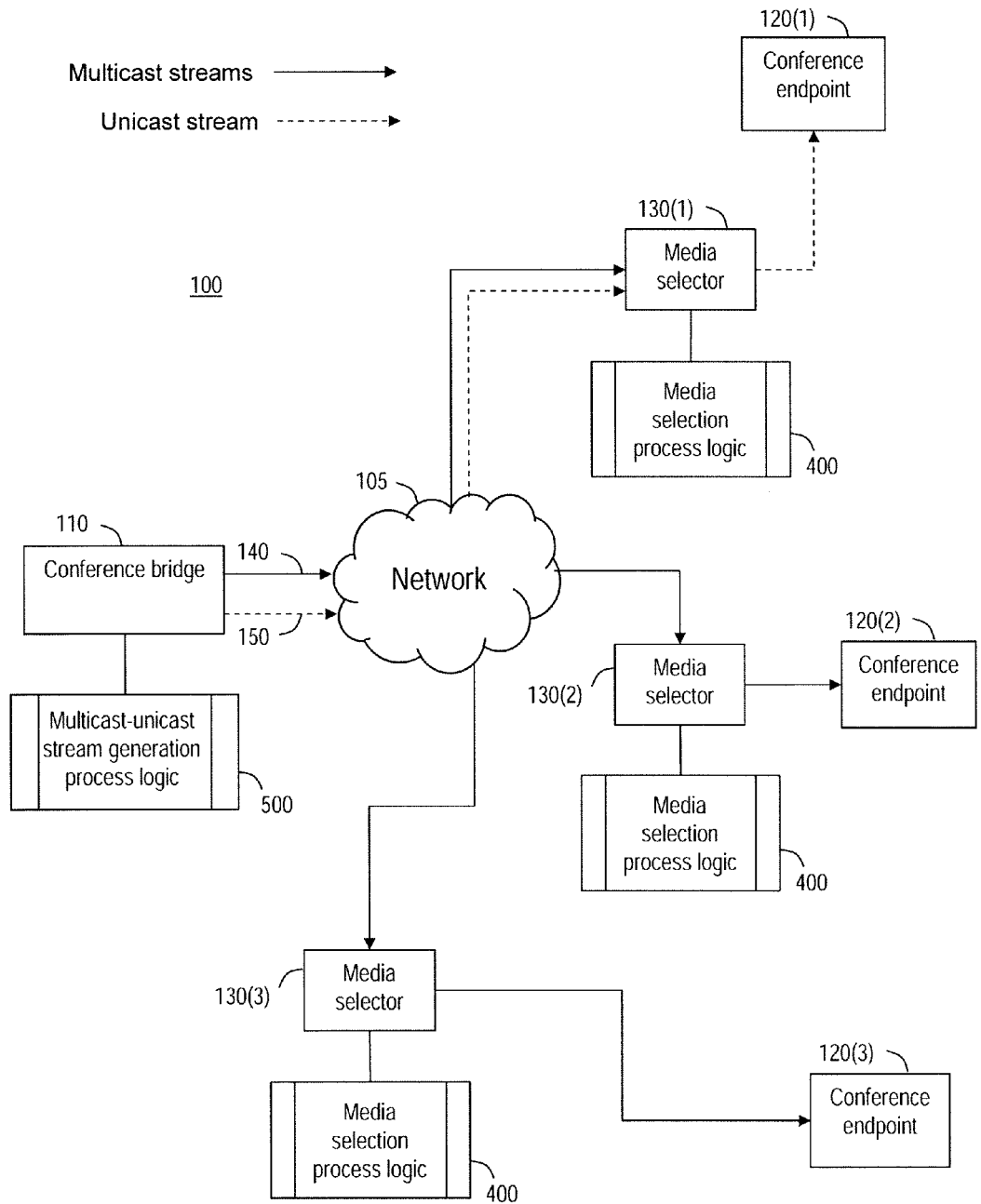
FIG. 1 is a block diagram showing an example of a video conferencing network with various network devices that are configured to select a multicast or unicast media stream for delivery to a conference endpoint.

Referring first to FIG. 1, a block diagram is shown that depicts a system 100 comprising various nodes or network devices that are engaged in a teleconferencing session. The system 100 has a network 105, a conference bridge 110, a plurality of conference or attendee endpoints 120(1)-120(3), and a plurality of media selectors 130(1)-130(3). Although only three conference endpoints and three media selectors are shown, any number of these devices could be included in the teleconferencing session and in various combinations, e.g., one media selector may service more than one conference endpoint. Each of the media selectors 130(1)-130(3) is configured with media selection process logic 400 and conference bridge 110 is configured with multicast-unicast media stream generation process logic 500. Briefly, the media selection process logic 400 is configured to select certain media streams generated by multicast-unicast media stream generation process logic 500 and sent over the network 105 to the media selectors 130(1)-130(3). The details of process logic 400 will be described in connection with FIGS. 4, and 6-8, while the details of process logic 500 will be described in connection with FIG. 5. References to the elements depicted in FIG. 1 are made throughout this description.

As shown in FIG. 1, a multicast media stream 140 is depicted as a solid line and a unicast media stream 150 that is depicted as a dashed line, and both are streamed from the conference bridge 110. The multicast media stream 140 is distributed across network 105 according to a network multicasting protocol, e.g., Internet Group Management Protocol (IGMP) and Protocol Independent Multicast (PIM), while the unicast media stream is distributed according to the destination address. The multicast distribution from the conference bridge 110 assumes that a multicast tree has been built and all of the endpoints have joined the multicast group, e.g., according to IGMP and PIM. In this example, the multicast media stream 140 is sent to each of the conference endpoints 120(1)-120(3) and the unicast media stream 150 is sent to conference endpoint 120(1). By sending a multicast media stream, the techniques described herein save network bandwidth when compared to conventional teleconferencing networks that transmit unicast media streams to each conferee. The multicast media stream 140 and the unicast media stream 150 may be encapsulated using RTP to ensure reliable delivery to the endpoints 120(1)-120(3).

In one example, conference endpoint 120(1) is associated with a lecturer, a primary speaker, or a current speaker. The video and audio from the current speaker is sent to the conference bridge 110. The conference bridge 110 will generate a multicast media stream, e.g., multicast media stream 140, that includes the video of the current speaker received from conference endpoint 120(1) so that all participants in the teleconference may view the current speaker. The conference bridge 110 may also include the appropriate audio stream from conference endpoint 120(1) and mix any audio from conference endpoints 120(2) and 120(3) according to the teleconference system design or configuration. The audio portion may be included in the multicast media stream 140 or sent as a separate stream.

One issue with sending the multicast media stream to all conference endpoints is that the current speaker will see his or her own video and hear his or her own voice being echoed back via the multicast media stream 140. This effect will be unpleasant to the current speaker and cause the current speaker to become distracted. To compensate for this effect, conference bridge 110 generates unicast media stream 150 by executing the multicast-unicast media stream generation process logic 500. By sending the unicast media stream 150, e.g., to conference endpoint 120(1), media can be delivered to the current speaker that does not "echo" or contain the speaker's own audio or video. In this example, the media selector 130(1) would forward the unicast media stream 150 to conference endpoint 120(1) as shown. Any multicast media streams associated with the teleconference session, e.g., multicast media stream 140, would be dropped and not forwarded to conference endpoint 120(1). The unicast media stream 150 may include video from other endpoints, e.g., the conference endpoints 120(2) and 120(3). The video included in unicast media stream 150 may be periodically changed or cycled from endpoint to endpoint, or may be directed to an individual participant, e.g., an attendee that is asking the current speaker a question.

Figure 2:
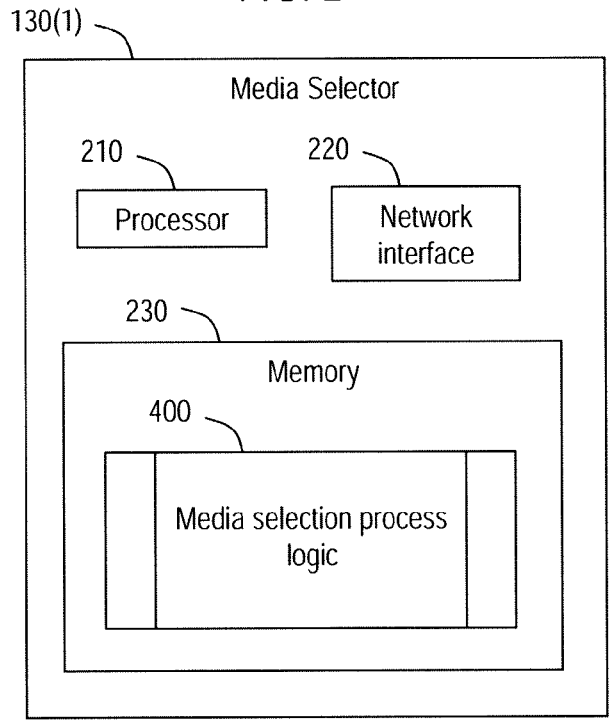
FIG. 2 is an example block diagram of a network device that is configured to select a multicast or unicast media stream for delivery to a conference endpoint according the techniques described herein.

Referring to FIG. 2, an example block diagram of a network device is shown that is configured to perform or execute the media selection process logic 400, e.g., media selector 130(1). Media selector 130(1) comprises a processor 210, a network interface unit 220, and a memory 230. The network interface unit 220 enables communication between the media selector 130(1) and other network elements in the network 100, such as by way of wired, wireless, or optical interfaces. The memory 230 stores instructions for the media selection process logic 400. The processor 210, when it executes instructions for the media selection process logic 400, selects the appropriate media stream, e.g., multicast media stream 140 or unicast media stream 150, to be sent to the destination endpoint, e.g., conference endpoint 120(1). The other media selectors shown in FIG. 1 have a similar configuration to that shown in FIG. 2.

The processor 210 is a data processing device, e.g., a microprocessor, microcontroller, systems on a chip (SOCs), or other fixed or programmable logic. The processor 210 interfaces with the memory 230 that may be any form of random access memory (RAM) or other data storage or memory block that stores data used for the techniques described herein and the instructions for the media selection process logic 400. The memory 230 may be separate or part of the processor 210. Instructions for performing the media selection process logic 400 may be stored in the memory 230 for execution by the processor 210.

The functions of the processor 210 may be implemented by a processor or computer readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 230 stores data used for the computations or functions described herein (and/or to store software or processor instructions that are executed to carry out the computations or functions described herein). Thus, the process 400 may be implemented with fixed logic or programmable logic (e.g., software/computer instructions executed by a processor or field programmable gate array (FPGA)), or the processor readable tangible medium may be encoded with instructions that, when executed by a processor, cause the processor to execute the process 400.

Figure 3:
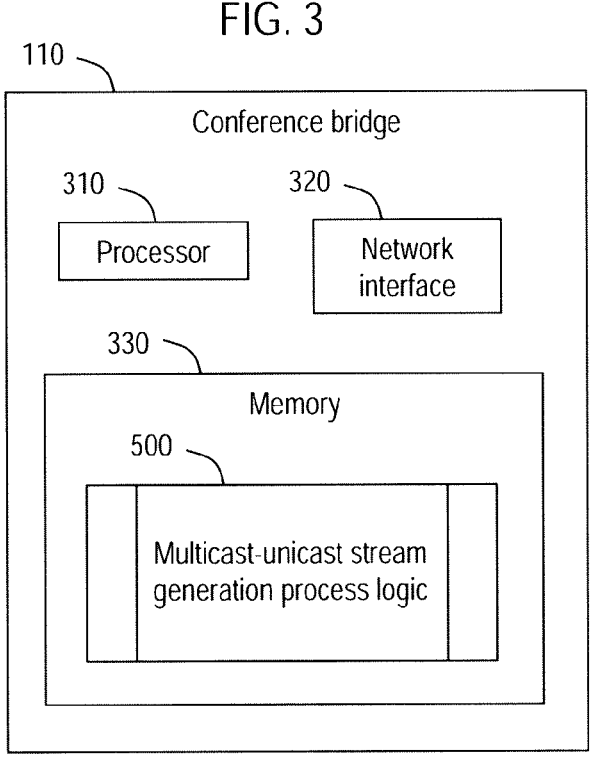
FIG. 3 is an example block diagram of a network device that is configured to generate multicast and unicast media streams according to the techniques described herein.

Referring to FIG. 3, an example block diagram of relevant portions of a second network device, e.g., conference bridge 110, is shown. This device comprises a processor 310, a network interface unit 320, and a memory 330. The processor 310, the network interface unit 320, and memory 330 may be configured to operate as described in connection with FIG. 2 for media selector 130(1). The device shown in FIG. 3 is configured to generate media streams by executing the multicast-unicast media stream generation process logic 500. The memory 330 stores instructions for the multicast-unicast media stream generation process logic 500. The multicast-unicast media stream generation process logic 500 generates the media streams using media information contained in packets received over the network 100. The media information need not be associated with a conference endpoint. For example, the current speaker may direct that a video clip or audio program be streamed to all participants via a remote server.

Figure 4:
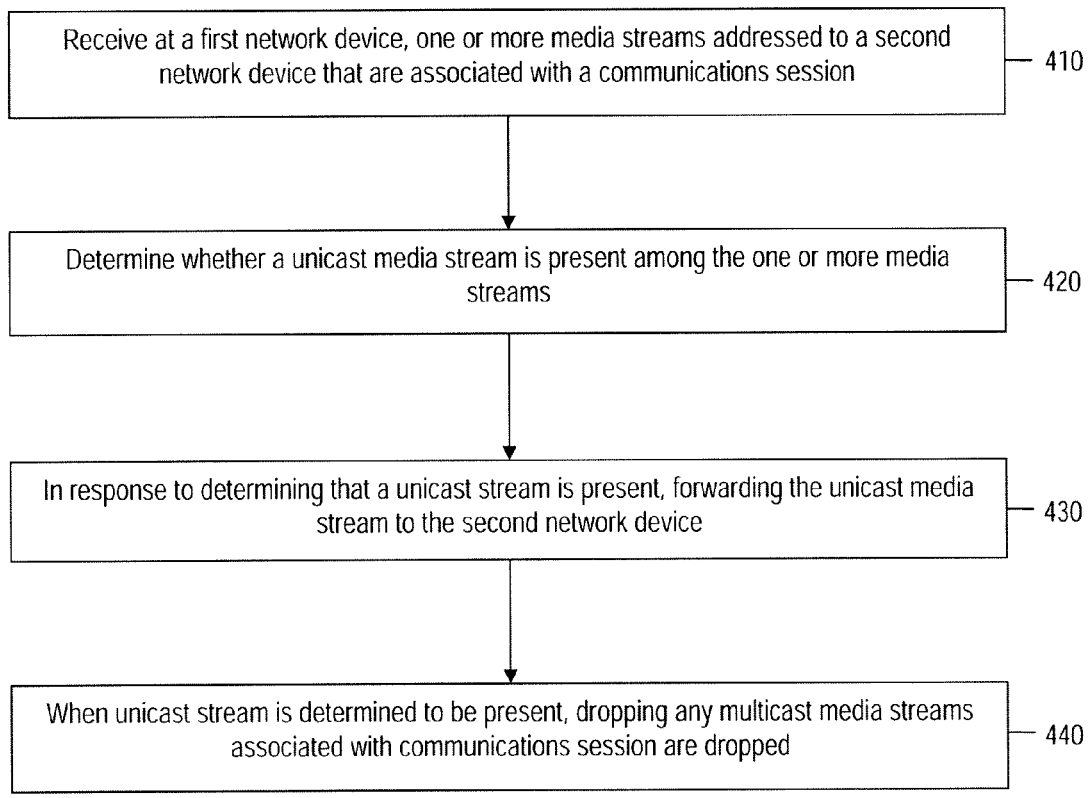
FIG. 4 is an example of a flowchart generally depicting the process for selecting a multicast or unicast media stream for delivery to a conference endpoint.

Turning now to FIG. 4 and also with reference to FIG. 1, a flowchart generally depicting the media selection process logic 400 will now be described. At 410, at a first network device, e.g., media selector 130(1), one or more media streams are received that are addressed to a second network device, e.g., conference endpoint 120(1). The one or more media streams are associated with a communication session. At 420, it is determined whether a unicast or multicast media stream is present among the one or more media streams. At 430, in response to determining that a unicast media stream is present, the unicast media stream is forwarded to the second network device. At 440, when a unicast media stream is present, any multicast media streams associated with a communication session are dropped by media selector 130(1) and are not forwarded to conference endpoint 120(1). When it is determined that a unicast media stream is not present, any multicast media streams associated with a communication session are forwarded or continue to be forwarded to the second network device.

Figure 5:
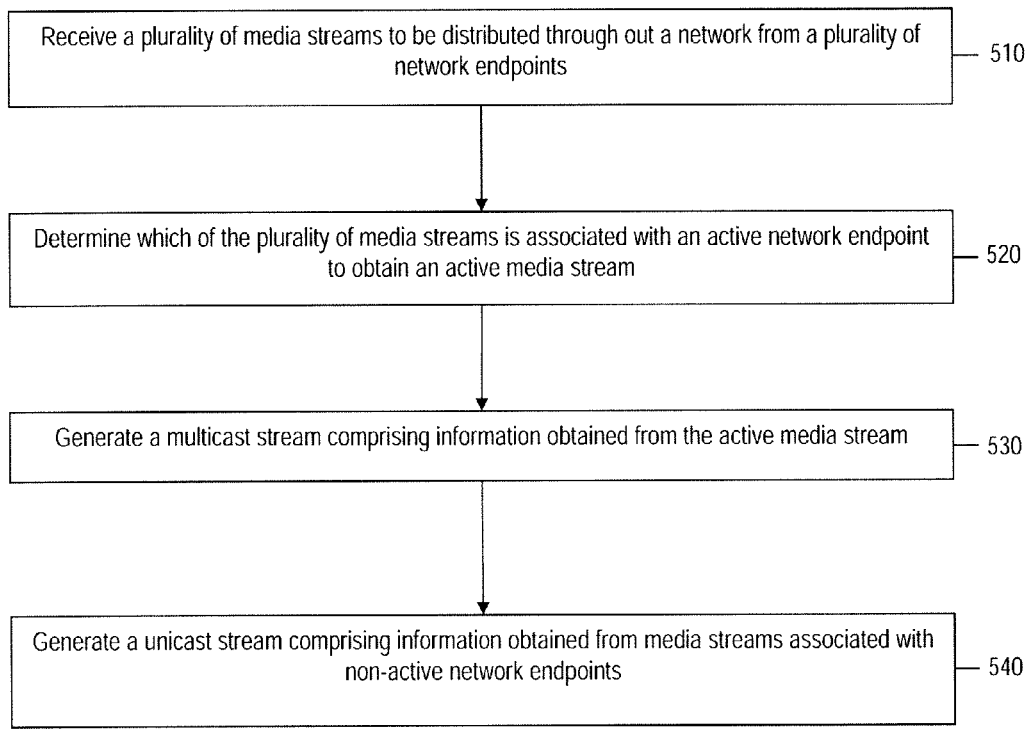
FIG. 5 is an example of a flowchart generally depicting the process for generating multicast and unicast media streams.

Referring to FIG. 5 and also with reference to FIG. 1, a flowchart is shown that generally depicts the process for generating multicast and unicast media streams using the multicast-unicast media stream generation process logic 500 by the conference bridge. At 510, a plurality of media streams to be distributed throughout a network is received from a plurality of network endpoints. In one example, the plurality of media streams is received by conference bridge 110 from each of conference endpoints 120(1)-120(3). At 520, the conference bridge determines which of the plurality of media streams is associated with an active endpoint to obtain an active media stream. An active endpoint may be associated with a current speaker or lecturer, e.g., conference endpoint 120(1) as described above.

At 530, a multicast media stream is generated that comprises information obtained from the active media stream. For example, multicast media stream 140 is generated based on information obtained from a media stream that is received from conference endpoint 120(1). Multicast media stream 140 may be multicast from conference bridge 110 to all conference endpoints 120(1)-120(3). At 540, a unicast media stream is generated that comprises information obtained from media streams associated with non-active endpoints. Unicast media stream 150 may be generated from media streams that are received from conference endpoints 120(2)-120(3) or other media servers, and normally would not contain information from conference endpoint 120(1), i.e., unicast media stream 150 would not normally contain information from the active media stream.

Figure 6:
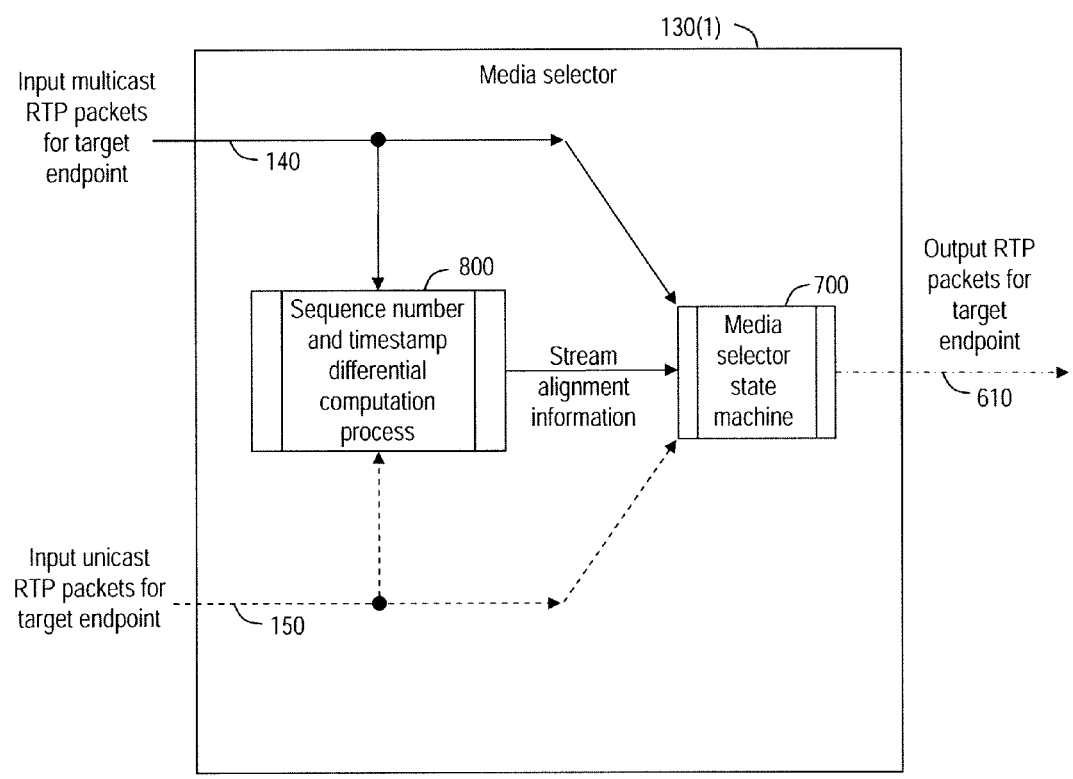
FIG. 6 is an example of a block diagram of a device with a functional diagram overlay generally depicting a process for selecting a multicast or unicast Real-time Transport Protocol (RTP) stream for delivery to another device.

Referring to FIG. 6 and also with reference to FIG. 1, an example of a device is shown, e.g., media selector 130(1), with a functional diagram overlay that generally depicts a process for selecting a multicast or unicast RTP stream for delivery to another device. In this example, the multicast RTP stream 140 and the unicast RTP stream 150 from FIG. 1 are received by the media selector 130(1). The media selector 130(1) employs a media selector state machine 700 that selects either the multicast RTP stream 140 or the unicast RTP stream 150 for output as RTP stream 610. The operations of the media selector state machine 700 will be generally described in connection with FIG. 6 and described in detail hereinafter in connection with FIG. 7. The media selector state machine 700 provides one specific example of how to implement the media selection process logic 400. The media selector state machine 700 is assisted by a sequence number and timestamp differential computation process 800. The sequence number and timestamp differential computation process 800 will be generally described in connection with FIG. 6 and described in detail in connection with FIG. 8. The media selector state machine 700 and sequence number and timestamp differential computation process 800 can be viewed as sub-processes of the media selection process logic 400 executed by the processor 210 (FIG. 2).

In this example, RTP is used to ensure real-time end-to-end transfer of multimedia data so that a receiving endpoint can decode audio and video without unwanted artifacts, e.g., video macroblocking or intermittent audio. In this regard, the sequence number and timestamp differential computation process 800 helps align the video and audio for a smooth transition at the endpoint when the media selector 130(1) switches between media streams. In other implementations, secure RTP may be used and the media stream are encrypted, or decrypted and re-encrypted as the media streams pass through the various network devices.

The multicast RTP stream 140 and the unicast RTP stream 150 are addressed or targeted to a conference endpoint, e.g., conference endpoint 120(1). The RTP streams 140 and 150 are processed by a media selector state machine 700 and the media selector 130(1) outputs an RTP stream 610 that consists of either the multicast RTP stream 140 or the unicast RTP stream 150. For ease of description, it is assumed that the multicast RTP stream 140 is received for a period of time before the unicast RTP stream 150 is received. At this point in time, the media selector state machine 700 forwards the multicast RTP stream 140 to the desired endpoint. At some point later in time, the media selector 130(1) begins to receive the unicast RTP stream 150. Since a unicast media stream has been received, the media selector 130(1) will forward the unicast RTP stream 150 to conference endpoint 120(1) and drop the multicast RTP stream 140 as described above.

Before switching between multicast and unicast media streams, or vice versa, the impact that switching will have on the end user experience is determined. For example, many video encoder/decoders (codecs, e.g., MPEG-2, H.263, H.264 Advanced Video Coding, etc.) will encode video as a series of pictures or group of pictures (GOP). The video pictures in one GOP will be encoded using a base picture (typically known as an I-frame or IDR frame) to provide a framework for encoding additional pictures in the same GOP (known as P and B-frames/slices), for example, by motion predictions with compensations to reduce spatial and temporal redundancy of information for a lower bit rate. Spatio-temporal prediction takes advantage of the fact that not all parts of a picture will change or move from one picture to the next, i.e., whole pictures do not have to be sent every frame when streaming video. The encoding framework in a GOP typically has a hierarchy using a base I-frame with P-frames encoded on top of the I-frame, while B-frames may be encoded on top of the I-frame and P-frames. Pictures that are predicted from the base picture(s) in the GOP cannot be successfully decoded until the base pictures have been decoded, which implies that the switching should only occur at the GOP boundaries for better user experience.

The RTP encapsulates the motion pictures in packets for transmission over a packet switched IP network, e.g., the Internet. An endpoint can receive the motion pictures to decode and present the video to an end user. In order to provide real-time transfer of data, RTP places timestamps and sequence numbers in the RTP headers because the RTP packets may arrive at an endpoint out of sequence when transmitted over a packet switched network, and may subject to network latency or delay jitter. The endpoint reorders the packets before decoding, or otherwise compensates for lost packets or packets that arrive too late for decoding.

Once the packets are received and reordered, the decoder at conference endpoint 120(1) will attempt to provide the best video and audio within its capabilities. However, if switching between media streams occurs in the middle of a GOP or if a full base picture has not been received then the endpoint decoder may not be able to decode the video until a full base picture is received. If this occurs, the video may incur macroblocking or the picture may go blank until the start of next GOP. However, the information for marking a GOP is not available in the RTP packet headers so a media selector can be optionally implemented to acquire that, either utilizing Deep Packet Inspection (DPI) to retrieve GOP information from the RTP payload, or relying on explicit notifications of GOP boundaries from the endpoint video source by in-band signaling (e.g. codec-specific bits/messages in the RTP payload) or out-of-band signaling using separate control messages outside the RTP, to heuristically determine the appropriate switching time.

Since RTP sequence numbers and timestamps need to remain contiguous when switching between unicast and multicast packets, the sequence number and timestamp differential computation process 800 is employed to synchronize those sequence numbers and timestamps in the RTP headers. The process 800 looks at RTP headers from both the multicast media stream 140 and the unicast media stream 150, and updates the sequence numbers and timestamps in the unicast packets so that they will "look" contiguous with those in the multicast packets before and after switching between unicast and multicast media streams by the media selector state machine 700 when viewed by an endpoint. It should be understood that both the media selector state machine 700 and the sequence number and timestamp differential computation process 800 may be implemented separately or as part of the same application.

Figure 7:
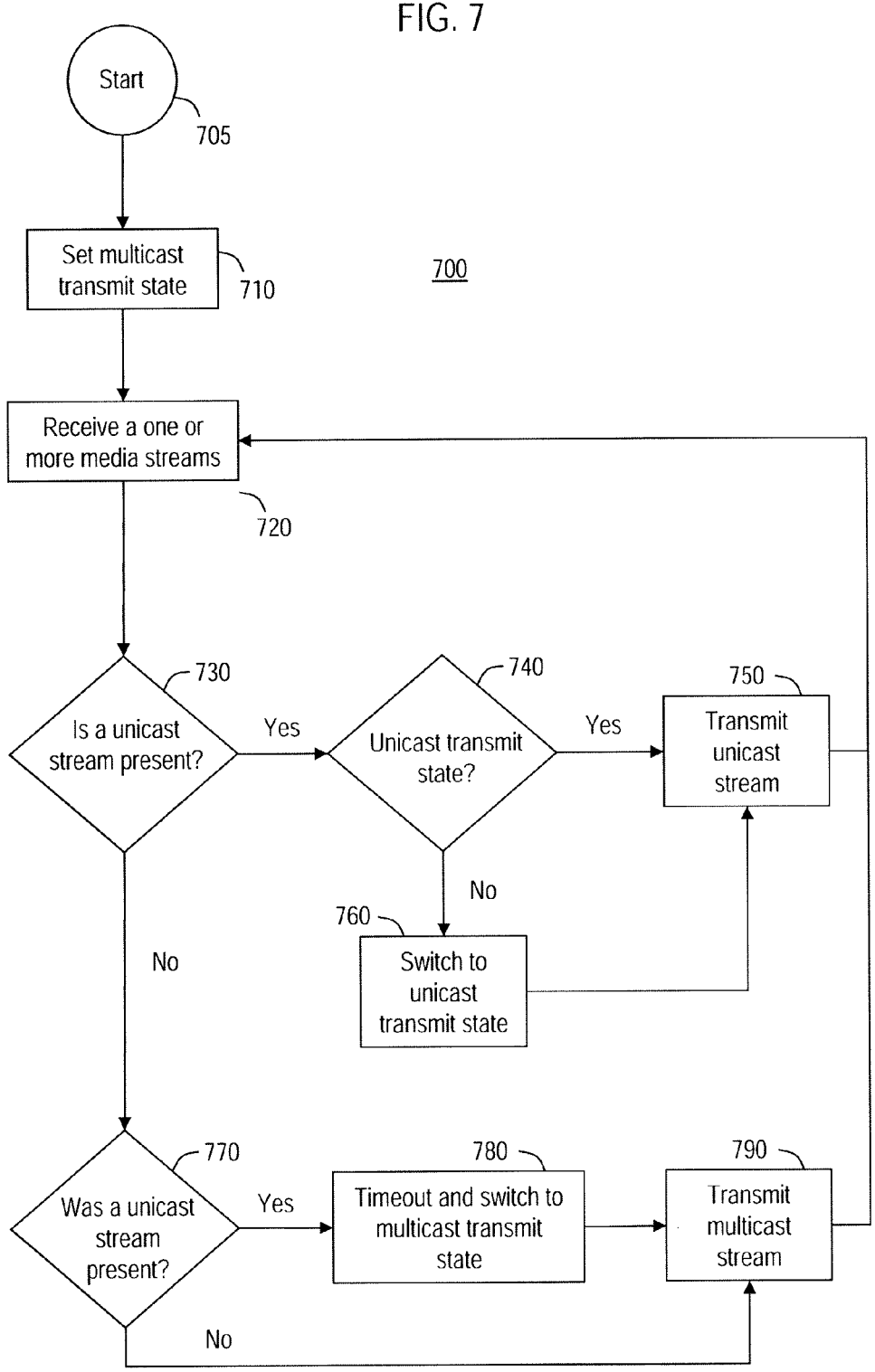
FIG. 7 is an example of a flowchart depicting an example of a process for selecting a multicast or unicast media stream for delivery to a conference endpoint.

Turning now to FIG. 7, an example of a flowchart is shown that depicts the operations of the media selector state machine 700 that selects a multicast or unicast media stream for delivery to a network endpoint. At 705, the state machine is started. At 710, the state machine is initialized or set to a multicast transmit state. When the media selector 130(1) is in the multicast transmit state, only multicast media streams are forwarded to an endpoint. At 720, one or more media streams are received by the media selector 130(1). At 730, it is determined if a unicast media stream is present from among the one or more media streams. If a unicast media stream is present, at 740, it is determined if the media selector, e.g., media selector 130(1) is in a unicast transmit state. When the media selector 130(1) is in the unicast transmit state, only unicast media streams are forwarded to an endpoint. If the media selector 130(1) is in the unicast transmit state, at 750, the unicast media stream is transmitted or forwarded to the conference endpoint, and the state machine continues at 720. If the media selector 130(1) is not in the unicast transmit state, at 760, the media selector 130(1) switches to the unicast transmit state, and at 750, the unicast media stream is transmitted to the conference endpoint, and the state machine continues at 720.

Referring again to operation 730, if a unicast media stream is not present, at 770, it is determined if the media selector 130(1) was previously receiving a unicast media stream. If so, the media selector 130(1) would be in the unicast transmit state according to a previous operation of the state machine, and at 780, the media selector 130(1) switches to the multicast media state. The media selector 130(1) may wait for a predetermined period of time, i.e., timeout due to inactivity, before switching to the multicast transmit state. In another example, the media selector state machine 700 may look at RTP header information to determine when to perform the switching operation, e.g., a marker bit in the RTP header may signal a switch, or an upcoming transition between multicast or unicast media streams. At 790, the multicast media stream is transmitted or forwarded to the conference endpoint, and the state machine continues at 720. If the media selector 130(1) was not previously receiving a unicast media stream, the media selector 130(1) would already be in the multicast transmit state, and at 790, the multicast media stream is transmitted to the conference endpoint, and the state machine continues at 720.

In an alternate example, at 710, the media selector state machine 700 could be initialized to a unicast transmit state and then modified with logic to switch to the multicast transmit state when a unicast media stream was not present. In some implementations, the media selector 130(1) may also run a hold state that queues multicast packets as part of the state machine 700. The hold state is a transient state to resolve possible timing issues when there is a possibility that the first packet of a new unicast media stream may arrive at the media selector 130(1) after a multicast packet with the same timestamp has already arrived. Absent any explicit out-of-band signaling from the conference bridge there is no guarantee that unicast packets arrive before multicasts packets with the same timestamp, i.e., the media selector 130(1) cannot predict a state change from multicast to unicast before it sees the first unicast packet.

In some instances, media selector 130(1) cannot rely on the marker bit in a multicast packet since the multicast packet is intended for every media selector, and is not specific to any individual media selector, i.e., the marker bit may indicate that several media selectors should change to the unicast transmit state. Thus, every media selector may need to change to the hold state and hold the multicast packets in a queue, and start a timer with a timeout typically as short as one packetization period or frame interval. Then, if the media selector 130(1) does receive new unicast packets, it can discard the queued multicast packets and change state to the unicast transmit state. If no new unicast packets are received, then upon timeout, the media selector 130(1) immediately sends any queued multicast packets, and returns to the multicast transmit state. The hold state may add a small delay jitter at the endpoint decoder and will require storage in the media selector 130(1) for the multicast packet queue.

In other instances, when there is no explicit signaling for the end of a unicast packet stream, the state machine 700, while in the unicast transmit state, may need to use an inactivity timeout as described above in connection with block 780 to detect that the unicast media stream has ended. The inactivity timeout may be set as short as a few packetization periods or frame intervals. The media selector 130(1) may also optionally buffer enough multicast packets while in the unicast transmit state (instead of discarding them all) to smoothly transition to the multicast transmit state when an inactivity timeout occurs. The media selector 130(1) can quickly compensate for any delay caused by the inactivity timeout by sending the buffered multicast packets to the corresponding endpoint.

Without explicit signaling, the techniques described above may add delay jitter to the audio, and for video, the buffered multicast packets are not always decodable due to possible dependency on earlier packets. As described above, these unwanted effects can be reduced by using explicit out-of-band signaling that signals the proper switch points at the GOP boundaries during media selection. Out-of-band signals may include indications, information, instruction, or signals from the conference bridge to switch between multicast and unicast streams, and is not included in media streams sent from the conference bridge.

Figure 8:
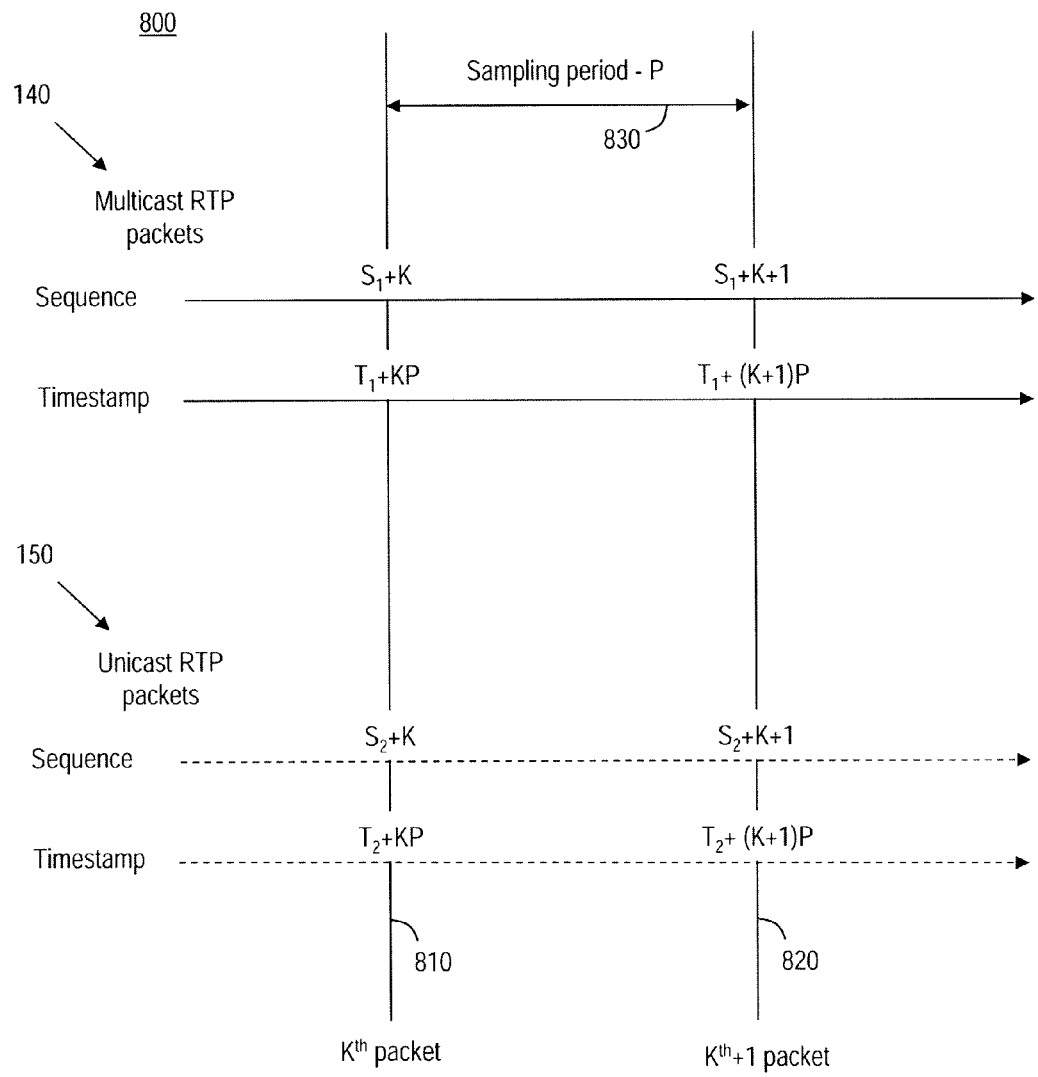
FIG. 8 is an example of a diagram generally depicting multicast and unicast RTP timing resolution.

Referring to FIG. 8, an example of a diagram is shown that generally depicts multicast and unicast RTP timing resolution according to the sequence number and timestamp differential computation process 800. The multicast RTP stream 140 and the unicast RTP stream 150 are received by, e.g., the media selector 130(1). At some point in time, at 810, a $K^{th}$ packet is received. At 820, the next or $K^{th}+1$ packet is received. At 830, the difference in time between received packets is referred to as the sampling period, P.

At the source where the multicast media stream 140 and the unicast media stream 150 are RTP encapsulated, e.g., conference bridge 110, sequence numbers, timestamps, and other information are inserted into the RTP headers prior to transmission. The initial sequence number for the multicast RTP stream 140 is denoted as $S_1$ in FIG. 8, and the initial timestamp is denoted as $T_1$. Accordingly, the sequence number at the $K^{th}$ packet is $S_1+K$, and the timestamp at the $K^{th}$ packet is $T_1+KP$. Similarly, the initial sequence number for the unicast RTP stream 150 is denoted as $S_2$ and the initial timestamp is denoted as $T_2$. The sequence number at the $K^{th}$ packet is $S_2+K$, and the timestamp at the $K^{th}$ packet is $T_2 KP$. The sequence numbers for the $K^{th}+1$ packets are incremented by 1 and the timestamps are incremented by P, as shown. In video packets, the timestamps are only incremented at a first packet of a next picture, and since the unicast and multicast streams both operate using the same behavior, the timestamp synchronization for unicast and multicast streams are each updated in the same manner, as described herein.

The sequence differential and timestamp differential between the multicast RTP stream 140 and the unicast RTP stream 150 can be computed as $S_1-S_2$ and $T_1-T_2$, respectively. The sequence and timestamp differentials can be used to determine a point in time in which the media streams can be seamlessly switched without a noticeable effect for the end user. In another, example the sequence numbers and timestamps may also be manipulated in the RTP headers to ensure a smooth transition at the endpoint. The video and audio may also be transcoded for a smooth transition depending on the codec capabilities of the media selector.

Figure 9:
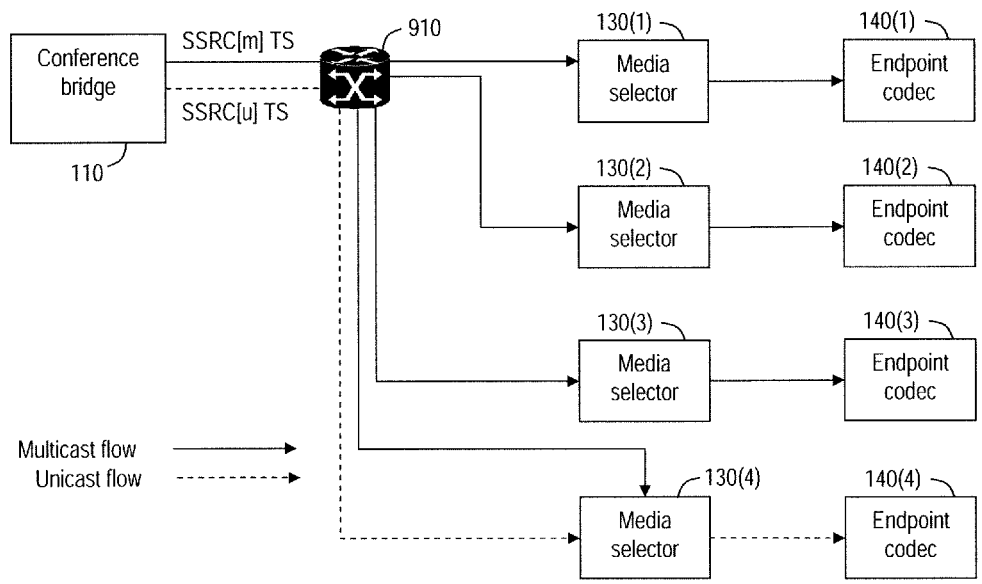
FIG. 9 is a block diagram showing an example of a video conferencing network with various network devices that are configured to select a multicast or unicast media stream for delivery to a network endpoint.

Referring to FIG. 9, a block diagram is shown that depicts an example of a video conferencing network with various network devices that are configured to select a multicast or unicast stream for delivery to a network endpoint. This network is similar to the network 100 from FIG. 1. The network has a conference bridge 110, a router 910, a plurality of media selectors 130(1)-130(4) and a plurality of the endpoints with endpoint codecs 140(1)-140(4). Each of the media streams has a synchronization source (SSRC) timestamp (TS) for each packet. SSRC[m] TS is the multicast media stream packet timestamp and SSRC[u] TS is the unicast media stream packet timestamp.

In this example, for each TS each of the media selectors 130(1)-130(4) will choose to forward a unicast packet, if one exists. Otherwise, the media selectors 130(1)-130(4) will forward any multicast packets addressed to the endpoint. When the streams change from multicast to unicast, or vice versa, the media selector can optionally notify the downstream endpoint codec that a change between multicast and unicast media streams will occur or has already occurred. Each of the media selectors 130(1)-130(4) can be stand alone devices or may be implemented in a router. In this example, the media selectors 130(1)-130(4) are incorporated into edge routers that are relatively close to each of the endpoint codecs 140(1)-140(4).

Figure 10:
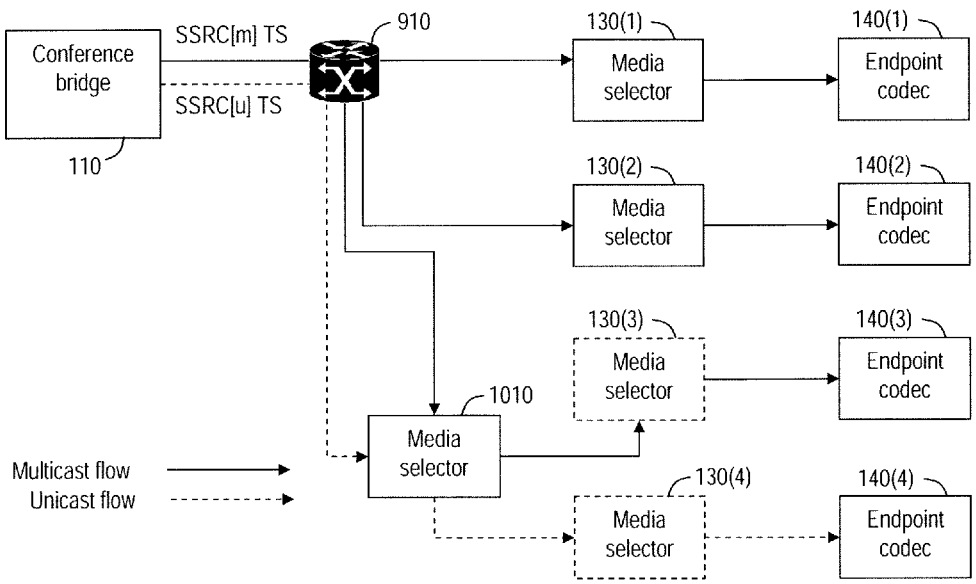
FIG. 10 is a block diagram similar to FIG. 9 and shows an additional network device that is configured to select a multicast or unicast media stream for delivery to a network endpoint.

Referring to FIG. 10, a block diagram similar to FIG. 9 is shown with an additional network device that is configured to select a multicast or unicast media stream for delivery to a network endpoint. In this example, media selector 1010 is introduced into the network to illustrate the scalability of the media selectors described herein. As mentioned above, the media selectors 130(1)-130(4) are incorporated into edge routers. In some instances, depending on network topology or current needs, the media selector may need to be placed further upstream, e.g., toward the conference bridge 110. In this example, media selector 1010 is placed between router 910 and media selectors 130(3) and 130(4). The media selector 1010 forwards the multicast media stream to the media selector 130(3) and forwards the unicast media stream to media selector 130(4). Media selectors 130(3) and 130(4) essentially become dormant or pass through devices as indicated by the dashed boxes. Media selectors 130(3) and 130(4) may be removed from the network, or left in place in case the media selector 1010 is later removed from the network or if the network topology changes.

The media selector 1010 has also pruned the multicast tree by not sending the multicast media stream to the media selector 130(4). In this case the media selector 1010 performs all of the queuing and timing control that media selectors 130(3) and 130(4) would normally perform.

Techniques have been described herein to add multicast media streams to teleconferencing sessions without the unwanted side effects that occur when a speaker's own media is echoed back to the speaker. Multicast and unicast media streams are generated by a network device, e.g., a conference bridge, and distributed to any number of endpoints, e.g., conference endpoints. A media selector is provided that selects the appropriate multicast or unicast media stream for forwarding to an associated network endpoint.

The above description is intended by way of example only.

What is claimed is:

1. A method comprising:
   receiving at a first network device in a network, one or more media streams addressed to a second network device that are associated with a communication session;
   setting the first network device to a multicast transmit state configured to cause the first network device to forward only multicast media streams to the second network device when in the multicast transmit state;
   determining whether a unicast media stream is present among the one or more media streams;
   in response to determining that a unicast media stream is present, forwarding the unicast media stream to the second network device; and
   forwarding only multicast media streams to the second network device when in the multicast transmit state.

2. The method of claim 1, wherein when a unicast media stream is determined to be present, further comprising dropping any multicast media streams associated with the communication session.

3. The method of claim 1, further comprising:
   in response to determining that a unicast media stream is not present, forwarding to the second network device any multicast media streams addressed to the second network device.

4. The method of claim 3, wherein forwarding comprises forwarding the unicast media stream or any multicast media streams in response to indications not included in the one or more media streams.

5. A method comprising:
   receiving at a first network device in a network, one or more media streams addressed to a second network device that are associated with a communication session;
   determining whether a unicast media stream is present among the one or more media streams; and
   setting the first network device to a unicast transmit state in response to determining that a unicast media stream is present; and
   forwarding only the unicast media stream to the second network device when in the unicast transmit state.

6. The method of claim 5, further comprising:
   detecting that the unicast media stream is no longer present when in the unicast transmit state; and
   in response to detecting that the unicast media stream is no longer present, switching to the multicast transmit state.

7. The method of claim 6, further comprising waiting a predetermined period of time while detecting that the unicast media stream is no longer present before switching to the multicast transmit state.

8. The method of claim 4, wherein switching between the multicast transmit state or the unicast transmit state occurs in response to control information contained in packet headers of the unicast media stream or the multicast media stream.

9. The method of claim 5, wherein switching between a multicast transmit state or unicast transmit state occurs in response to timing information contained in packet headers of the unicast media stream or a multicast media stream, wherein the timing information comprises timestamps and sequence numbers to ensure a smooth media presentation transition at the second network device when switching between multicast and unicast transmit states.

10. The method of claim 5, further comprising inserting a third network device into the network between the source of the one or more media streams and the first network device, the third network device setting a multicast transmit state or unicast transmit state and wherein forwarding comprises forwarding multicast or unicast media streams based on the transmit state.

11. A method comprising:
receiving a plurality of media streams to be distributed throughout a network from a plurality of network endpoints;
determining which of the plurality of media streams is associated with an active network endpoint to obtain an active media stream;
generating a multicast media stream comprising information obtained from the active media stream; and
generating a unicast media stream comprising information obtained from media streams associated with non-active network endpoints.

12. The method of claim 11, further comprising:
sending the multicast media stream to the plurality of network endpoints; and
sending the unicast media stream to the active network endpoint.

13. The method of claim 11, wherein the plurality of network endpoints are associated with attendees of a teleconference session and the active network endpoint is currently capturing media, and further comprising:
selecting a predetermined number of media streams associated with attendees at other network endpoints that are in the teleconference session with the active network endpoint;
generating additional unicast media streams corresponding to the predetermined number of media streams such that a corresponding unicast media stream does not echo media information back to a network endpoint of a corresponding attendee; and
sending the corresponding unicast media streams to the corresponding attendees.

14. The method of claim 11, further comprising:
generating control information configured to indicate that a network device is to forward multicast media streams or unicast media streams to individual ones of the plurality of network endpoints; and
inserting the control information into the appropriate multicast or unicast media streams.

15. An apparatus comprising:
a network interface unit configured to transmit and receive media streams over a network; and
a processor configured to be coupled to the network interface unit and configured to:
receive via the network interface unit one or more media streams that are associated with a communication session and addressed to a network device;
set the network interface unit to a multicast transmit state configured to forward only multicast media streams to the network device when in the multicast transmit state;
determine whether a unicast media stream is present among the one or more media streams;
in response to determining that a unicast media stream is present, forward the unicast media stream to the network device via the network interface unit; and
forward only multicast media streams to the second network device when in the multicast transmit state.

16. The apparatus of claim 15, wherein when the processor is configured to determine that a unicast media stream is present, and to drop any multicast media streams associated with the communication session.

17. The apparatus of claim 15, wherein the processor is further configured to forward to the network device any multicast media streams addressed to the network device when the processor determines that a unicast media stream is not present.

18. The apparatus of claim 17, wherein the processor is further configured to:
receive instructions not included in the one or more media streams; and
forward the unicast media stream or any multicast media streams in response to the instructions.

19. The apparatus of claim 17, wherein the processor is further configured to:
wait a predetermined period of time when the unicast media stream is no longer present before forwarding any multicast media streams addressed to the network device.

20. A non-transitory computer readable medium storing instructions that, when executed by a processor, cause the processor to:
receive via a network interface unit one or more media streams addressed to a network device that are associated with a communication session;
set the network interface unit to a multicast transmit state configured to forward only multicast media streams to the network device when in the multicast transmit state;
determine whether a unicast media stream is present among the one or more media streams;
in response to determining that a unicast media stream is present, forward the unicast media stream to the network device via the network interface unit; and
forward only multicast media streams to the second network device when in the multicast transmit state.

21. The non-transitory computer readable medium of claim 20, and further comprising instructions that, when executed by a processor, cause the processor to drop any multicast media streams associated with the communication session when it is determined that a unicast media stream is present.

22. The non-transitory computer readable medium of claim 20, and further comprising instructions that, when executed by a processor, cause the processor to forward to the network device any multicast media streams addressed to the network device when it is determined that a unicast media stream is not present.

23. The non-transitory computer readable medium of claim 22, and further comprising instructions that, when executed by a processor, cause the processor to receive signals not included in the one or more media streams, and wherein the instructions that cause the processor to forward comprise instructions that cause the processor to forward the unicast media stream or any multicast media streams in response to the signals.

* * * * *

UNITED STATES PATENT AND TRADEMARK OFFICE
CERTIFICATE OF CORRECTION

PATENT NO. : 8,335,172 B2  
APPLICATION NO. : 12/797716  
DATED : December 18, 2012  
INVENTOR(S) : Lai et al.

It is certified that error appears in the above-identified patent and that said Letters Patent is hereby corrected as shown below:

In the Claims

Column 10, line 58, replace "of claim 4" with -- of claim 5 --.

Signed and Sealed this  
Twenty-fourth Day of December, 2013

Margaret A. Focarino  
*Commissioner for Patents of the United States Patent and Trademark Office*